United States Patent [19]

Takahashi et al.

[11] Patent Number: 4,773,702
[45] Date of Patent: Sep. 27, 1988

[54] REVERSIBLE SEAT PAD FOR A BABY CARRIAGE

[75] Inventors: Takehiko Takahashi; Koichi Kobayashi, both of Tokyo, Japan

[73] Assignee: Combi Co., Ltd., Tokyo, Japan

[21] Appl. No.: 63,381

[22] Filed: Jun. 18, 1987

[51] Int. Cl.⁴ .................................. A47C 27/00
[52] U.S. Cl. ......................... 297/218; 297/DIG. 1; 297/DIG. 4
[58] Field of Search ............... 297/223, 218, DIG. 1, 297/DIG. 4, 218; 5/481, 470, 471, 420; 280/644

[56] References Cited

U.S. PATENT DOCUMENTS

| | | | |
|---|---|---|---|
| 2,034,403 | 3/1936 | Levi | 297/223 |
| 2,468,587 | 4/1949 | Chase et al. | 297/223 |
| 3,550,998 | 12/1970 | Boudreau et al. | 280/31 |
| 3,659,865 | 5/1972 | Nothacker | 280/7.1 |
| 3,924,284 | 12/1975 | Nelson | 5/481 |
| 4,157,839 | 1/1979 | Lahti et al. | 280/644 |
| 4,293,144 | 10/1981 | Ida | 280/644 |
| 4,319,781 | 3/1982 | Tsuge | 297/DIG. 1 |
| 4,457,032 | 7/1984 | Clarke | 5/481 |

FOREIGN PATENT DOCUMENTS

| | | |
|---|---|---|
| 5610615 | 3/1975 | Japan. |
| 5733825 | 8/1980 | Japan. |
| 5750933 | 9/1980 | Japan. |
| 58-158755 | 9/1983 | Japan. |

*Primary Examiner*—James T. McCall
*Attorney, Agent, or Firm*—Sughrue, Mion, Zinn, Macpeak & Seas

[57] ABSTRACT

A reversible cover for a baby seat with a three-dimensional seat support, comprising a core of foamed urethane with a smooth side and a side with hills and valleys and a cover around the core. The cover is made of air breathing seersucker on the smooth side of the core and is made of soft, insulating pile on the hill-and-valley side. The cover closely conforms to the seat support and can be reversed with the pile side being used during the winter and the seersucker side during the summer.

11 Claims, 2 Drawing Sheets

REVERSIBLE SEAT PAD FOR A BABY CARRIAGE

BACKGROUND OF THE INVENTION

1. Field of the Invention

The invention relates generally to baby carriages. In particular, the invention relates to a seat pad for a baby carriage.

2. Background of the Invention

Baby carriages have been well known for many years in a variety of configurations. Recently, there has been an increased interest in providing baby carriages with features that are convenient to the parent and are comfortable and safe for the child.

The type of baby carriage to which the present invention is directed includes a rigid frame for supporting the baby. The rigid frame may be in the form of a rigid shell, such as disclosed by Boudreau et al in U.S. Pat. No. 3,550,998 and by Nothacker et al in U.S. Pat. No. 3,659,865. Alternatively, the rigid backrest may be reclined, as disclosed in Japanese Utility Model Publication No. 58-158755 allow for different postures of the baby, for example sitting and lying flat. It is typical in such rigid frame baby carriages to provide a pad or cover between the frame and the child, as illustrated by Nothacker et al. The pad performs several functions. It cushions the baby against the hard frame. The cushioning is further advantageous in tht it prevents the sliding of the baby on the frame. Furthermore, the pad performs to some extent temperature control of the baby. It is preferably that the pad insulate the baby in cold weather but that it provide air flow in warmer weather to remove excess moisture from the area of the baby.

In some baby carriages the pad is permanently or fixedly attached to the frame. In others, the pad is detachable. A detachable pad has the additional advantage of being amenable to washing, as well as the advantage of dealing with a frame body as in the fixed pad.

A reversible pad is known in which its two sides are respectively more appropriate for cold or hot weather. Japanese Utility Model Publication No. 57-10615 discloses a pad with two layers of a matte material. Each layer is more appropriate for facing the baby during the cold or hot season. The combined matte structure is made by connecting two layers to each other in an entangled manner along the interface. Japanese Utility Model Publication No. 57-50933 discloses a similar structure using a non-woven fibrous pad. Two layers of the structure are covered by cloth.

Japanese Utility Model Publication No. 57-33825 discloses a pad for use with a baby stroller in which a urethane core is formed with a smooth side and a bumpy side. A pile fabric covers the pad on the bumpy side of the core. However, this pad has a shaped bottom and is not intended to be reversed.

SUMMARY OF THE INVENTION

An object of the invention is to provide a pad for a baby carriage which can be used in both hot and cold weather.

A further object of the invention is to provide such a pad which is easy to manufacture.

The invention can be summarized as a pad for a baby carriage which pad is reversible. The core of the pad is foamed urethane with one side smooth and the other side having smoothly undulating projections. The core is covered by a cover which is made different material on the two main sides of the pad. The cover on the summer side is an air passing material such as seersucker and faces the smooth side of the core. The cover on the winter side is an insulating material such as a pile and faces the projections of the core. The pad and cover are in a three dimensional form which can be reversed, in conformity with a rigid frame of the baby carriage.

DETAILED DESCRIPTION OF THE PREFERRED EMBODIMENT

Figure 1:
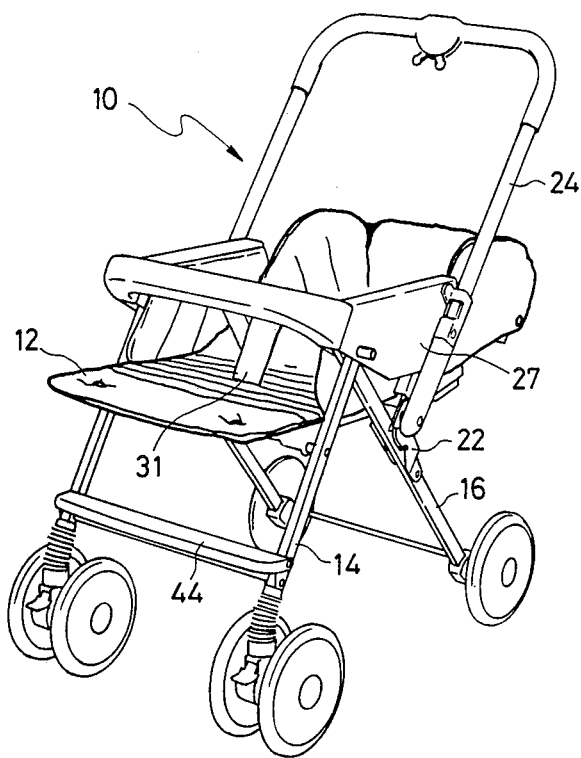
FIG. 1 is a perspective view of a baby carriage with the pad attached thereto.

In FIG. 1 is shown a baby carriage 10 to which is attached a reversible pad 12 in the area of the carriage 10 generally supporting the baby.

Figure 2:
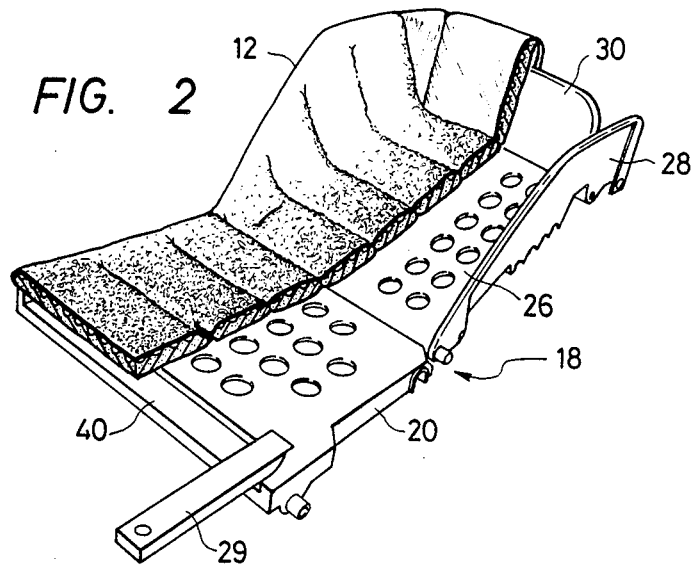
FIG. 2 is a perspective view of the pad support of the baby carriage with the pad shown in cross section. The pile side faces upward in the figure.

The baby carriage 10 has a seat support 18, illustrated in FIG. 2. The seat support 18 has a seat section 20, which is pivotally mounted at the front to the front legs 14 and at the back to a pivot structure 22 pivoting on the rear legs 16 and holding the bottom end of a handle bar 24 of the baby carriage 10. The seat support 18 also has a back section 26 with two integral shoulder guards 28. The lower end of the back section 26 pivots on the pivot structure 22 and is additionally supported by unillustrated movable arms to a side frame 28 of the baby carriage 10. The back section 26 can thereby be moved about its lower pivot to adjust the inclination of the seat support 18. The effect in a fully opened baby carriage 10 is that the seat section 20 is horizontal and rigid and the back section 26 can be rotated about the rear of the seat section 20 although there is no direct connection between the seat and back sections 20 and 26. A head rest 30 is pivotally attached to the top of the back section 26 and is mechanically linked thereto. When the back section 26 is in the fully upright position, actually somewhat inclined from the vertical, the head rest 30 is flush with the central portion of the back section 26. When back section 26 is adjusted to be nearly horizontal, as illustrated in FIG. 2, the head rest 30 is nearly vertical.

Figure 3:
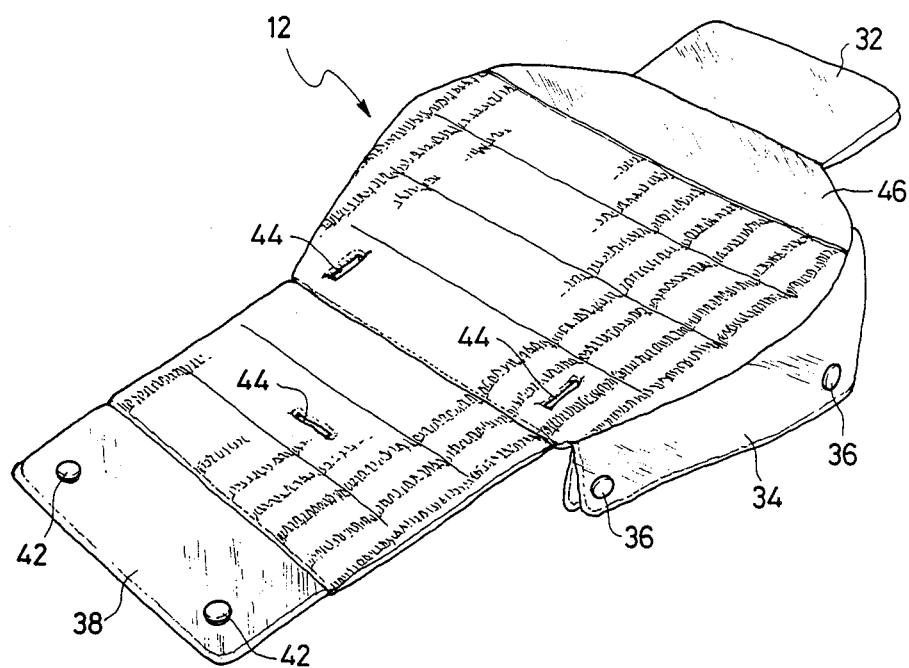
FIG. 3 is a perspective view of the pad with the seersucker side facing upward.

The reversible pad 12, fully illustrated in FIG. 3, is attached to various parts of the seat support 18. A top sleeve 32 is open at its outer end and closed on its sides and where it is attached to the rest 30 of the pad 12. The top sleeve 32 slips over the top of the head rest 30. Similarly two side sleeves 34 slip over the shoulder guards 28. The side sleeves 34 are open on the outer and lower sides. Two snaps 36 on the interior of the side sleeves 34 snap into corresponding snap structures on the shoulder guards 28. Because the pad 12 is reversible, the snaps 36 are replicated on both interior surfaces of the side sleeves 34.

A foot section 38 of the pad 12 extends beyond the forward end of the seat section 20 of the seat support 18. There are two arms 29 rotatably connected at the forward outer corners of the seat section 20 so that they can change between a retracted position in a front recess 40 of the seat section 20 to a projected position extending forward of the seat section 20. For smaller, less active children, the seat section 20 can be effectively extended forward by projecting these arms 29 forward and attaching snaps 42 in the foot section 38 to corresponding snap structures on the arms. This extended configuration is illustrated in FIG. 1. For larger children, the arms are retracted so that the foot section 38 of the pad 12 hangs down toward a foot rest 44 of the baby carriage 10. Because the pad 12 is reversible, the snaps 42 are replicated on each side of the foot section 38.

Three slits 44 in the pad 12 allow the passage of a seat belt 31 attached to the seat and back sections 20 and 26.

The top sleeve 32, the side sleeves 34 and the cover for the foot rest 38 and an upper back part 46 are made of 100% polyester of 300 dernier. This material is also called France fabric.

Figure 4:
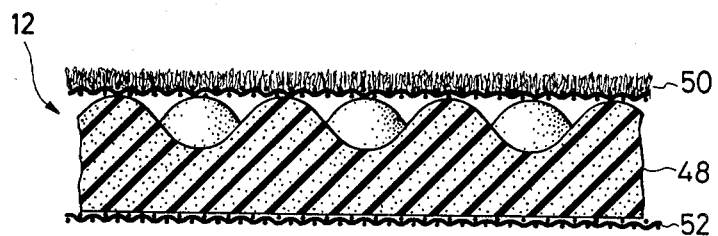
FIG. 4 is a cross sectional view of the pad and its cover.

The remainder of the pad 12 has a structure shown in cross section in FIG. 4. A core 48 is made of foamed urethane that easily breathes. The core 48 is manufactured so that it consists of hills and valleys having a pitch of about 3 cm. The thickness of the core 48 in the hill portions is about 1.6 cm and in the valley portions is about 0.9 cm. The hills and valleys face the side of the pad 12 which is intended for cool weather use. This side will be referred to as the winter side. The other or summer side of the core 48 is smooth. The core 48 extends through the central part of the pad 12 and also extends into the foot section 38 and the upper back part 46 of the pad 12.

The cover for the pad 12 is also shown in FIG. 4 and consists of different materials on the summer and winter side. The cover on the winter side is a pile layer 50. The pile layer 50 is 100% cotton and is made by a semi-shearing process. In a shearing process, a very loose weft is woven on a tight warp. Then the free ends of the loose weft on one side are all cut so as to provide a very soft fibrous surface. In the semi-shearing process, only some of the loose weft on the one side are cut. The sheared side of the pile layer 50 faces outwardly away from the hills and valleys of the core 48.

The cover on the summer side consists of a seersucker layer 52. The seersucker layer 52 is 35% cotton and 65% polyester. Seersucker is woven such that lines of puckers are formed which remain in the material regardless of washing. In the present case, the puckers are arranged in columns about 3.8 cm apart. The puckers are transverse to the columns, extend about 1 cm and are separated from each other by about 0.4 cm although there is much variation in this latter dimension.

The winter, or pile, side of the pad 12 provides additional warmth to the baby. The pile closely contacts the baby and blocks the flow of air. Thereby, the baby is further insulated. Also, the hills and valleys of the core 48 are more easily deformed by the weight of the baby. Thereby, the baby sinks further into the pad providing even greater insulating qualities. Nonetheless, there is sufficient air flow to prevent the build up of moisture due to the air layer remained even if the hills are deformed.

The summer, or seersucker, side of the pad 12 provides a great amount of air flow. Seersucker is well known for its cool qualities in hot weather. Furthermore, the summer side of the core 48 is relatively hard so that it is not as greatly deformed by the baby's weight. Thereby, excessive sinking into the pad 12 is prevented in warmer weather.

As is evident in both FIGS. 1 and 2, the reversible pad 12 tightly conforms to the three-dimensionally shaped seat support 18. A portion of the upper back part 46 fits between the shoulder guards 28 and the head rest 30 as the head rest 30 is moved. This tight fit is accomplished with either side of the reversible pad 12 can be reversed from a winter configuration to a summer configuration and back again.

The pad of the invention has many advantages. It is reversible and each of its sides is designed for a different type of weather. The pad can be easily bent to conform with a complex and changing seat geometry. Nonetheless, its structure is simple and easy to manufacture.

Although the pad has been described with reference to a baby carriage it can be used with stationary infant chairs and other types of seats.

What is claimed is:

1. A pad for a seat comprising:
   a core of a foamed material of generally planar shape when undeformed with a first side thereof being relatively smooth and a second side thereof being substantially covered with projecting portions and depressed portions relative to said projecting portions; and
   a cover for covering said core, said cover including a first cover part of a first material disposed on said first side of said core and a second cover part of a second material disposed on said second side of said core to define cavities between said second cover part and said depressed portions, said first cover part being connected to said second cover part, said second material being softer and more resistant to passage of air than said first material, wherein said second side covered by said second cover part is adapted for greater deformation when in contact with a user than said first side covered by said first cover part, and said first side covered by said first cover part is adapted for greater air passage when in contact with the user than said second side covered by said second cover part, and wherein said core and cover are adaptable to conform to a form of said seat with either said first material or said second material facing outward from said seat for contacting the user.

2. A pad as recited in claim 1, wherein said seat has a three-dimensional form.

3. A pad as recited in claim 1, wherein said seat has a changeable three-dimensional form and wherein said core and cover are adaptable to conform to said changeable three-dimensional form.

4. A pad is recited in claim 3, wherein said cover further comprises sleeve parts not overlying said core and capable of surrounding projections of said seat.

5. A pad as recited in claim 1, wherein said second material comprises a pile material.

6. A pad as recited in claim 5, wherein said first material comprises a woven cloth of continuous yarn.

7. A pad as recited in claim 6, wherein said first material is seersucker.

8. A pad as recited in claim 6, wherein said first material comprises cotton and polyester and wherein said second material substantially consists of cotton.

9. A pad as recited in claim 8, wherein said foamed material comprises urethane.

10. A baby carriage, comprising:
    a collapsible support frame including wheels;
    a seat support for supporting an infant, connected to said collapsible support frame and having a varying three-dimensional form as said support collapses; and a reversible cover for said seat support comprising a foamed core having a smooth first side and an undulatory second side having projecting portions and depressed portions relative to said projecting portions, a first cover part of a first material for covering at least a portion of said first side of said core and a second cover part connected to said first cover part for covering at least a portion of said second side of said core and defining cavities between said second cover part and said depressed portions, said second material being softer and less permeable to air flow than said first material, said reversible cover being conformable to said varying three-dimensional form with either said first cover part or said second cover part facing away from said seat support for contacting the infant, wherein said second side covered by said second cover part is adapted for greater deformation when in contact with a user than said first side covered by said first cover part, and said first side covered by said first cover part is adapted for greater air passage when in contact with the user than said second side covered by said second cover part.

11. A baby carriage as recited in claim 10, wherein said first material is a seersucker and said second material is a pile material.

* * * * *